United States Patent
Koczara et al.

(10) Patent No.: US 7,233,123 B2
(45) Date of Patent: Jun. 19, 2007

(54) ELECTRICAL MACHINE ROTOR POSITION IDENTIFICATION

(75) Inventors: Wlodzimierz Koczara, Warsaw (PL); Piotr Adam Jakubowski, Warsaw (PL)

(73) Assignee: Cummins Generator Technologies Limited, Lincolnshire (GB)

( * ) Notice: Subject to any disclaimer, the term of this patent is extended or adjusted under 35 U.S.C. 154(b) by 0 days.

(21) Appl. No.: 11/174,762

(22) Filed: Jul. 5, 2005

(65) Prior Publication Data

US 2006/0006833 A1 Jan. 12, 2006

(30) Foreign Application Priority Data

Jul. 6, 2004 (GB) ................................ 0415153.6

(51) Int. Cl.
*H02P 27/04* (2006.01)
(52) U.S. Cl. ...................... 318/800; 318/138; 318/439; 318/254
(58) Field of Classification Search ................ 318/138, 318/254, 439, 699–832
See application file for complete search history.

(56) References Cited

U.S. PATENT DOCUMENTS

| | | | | |
|---|---|---|---|---|
| 4,629,959 A | * | 12/1986 | Okuyama et al. | 318/727 |
| 5,159,246 A | * | 10/1992 | Ueki | 318/254 |
| 5,821,713 A | | 10/1998 | Holling et al. | 318/439 |
| 5,844,385 A | | 12/1998 | Jones et al. | 318/254 |
| 6,066,928 A | * | 5/2000 | Kinoshita et al. | 318/139 |
| 6,172,498 B1 | | 1/2001 | Schmidt et al. | 324/207.12 |
| 6,369,541 B1 | * | 4/2002 | Albert | 318/560 |
| 6,400,118 B2 | * | 6/2002 | Kinpara et al. | 318/721 |
| 6,512,341 B2 | * | 1/2003 | Matsushiro et al. | 318/254 |
| 6,642,681 B2 | * | 11/2003 | Kawabata et al. | 318/431 |
| 6,806,671 B2 | * | 10/2004 | Kusaka et al. | 318/442 |
| 6,850,863 B2 | * | 2/2005 | Benchaib et al. | 702/151 |

(Continued)

FOREIGN PATENT DOCUMENTS

EP 0 732 801 A3 10/1996

(Continued)

OTHER PUBLICATIONS

European Patent Office Search Report from GB 01415153 application, dated Apr. 25, 2005.

(Continued)

*Primary Examiner*—Lincoln Donovan
*Assistant Examiner*—Tyrone Smith
(74) *Attorney, Agent, or Firm*—Hamre, Schumann, Mueller & Larson, PC (57) ABSTRACT

A method of and system for identifying the position of magnetic poles of a rotor of a multi-phase electrical machine relative to a stator of that machine is disclosed. The method includes the steps of applying a voltage pulse to stator windings of each phase, sensing current flow in the stator windings of each phase due to the application of the voltage pulse to the respective stator windings and determining the position of the magnetic poles of the rotor relative to the stator using the sensed current flow in the stator windings of each phase. The method is characterized in that the phases of the stator windings are star-connected at a neutral junction and the voltage pulse is applied to the stator windings of each phase in parallel.

13 Claims, 8 Drawing Sheets

U.S. PATENT DOCUMENTS

| | | | |
|---|---|---|---|
| 7,026,774 B2 * | 4/2006 | Inaba et al. | 318/254 |
| 7,088,067 B2 * | 8/2006 | Yamamoto et al. | 318/432 |
| 7,122,980 B2 * | 10/2006 | Kuroshima et al. | 318/254 |
| 2007/0018599 A1 * | 1/2007 | Yamamoto et al. | 318/439 |

FOREIGN PATENT DOCUMENTS

| | | | |
|---|---|---|---|
| EP | 1 139 5460 A1 | | 10/2001 |
| JP | 54-119609 | * | 9/1979 |
| JP | 2002-165488 | * | 6/2005 |
| WO | WO 02/089292 A3 | | 11/2002 |
| WO | WO 03/026125 A1 | | 3/2003 |

OTHER PUBLICATIONS

Schmidt, Peter, et al., "Initial Rotor Angle Detection of a Non-Salient Pole Permanent Magnet Synchronous Machine", IEEE IAS, Annual Meeting, Oct. 5, 1997, 5 pgs.

* cited by examiner

ELECTRICAL MACHINE ROTOR POSITION IDENTIFICATION

CROSS-REFERENCES TO RELATED APPLICATIONS

Applicant claims foreign priority benefits under 35 U.S.C. 119(a)–(d) of the following foreign application for patent: United Kingdom Patent Application No. GB 0415153.6, filed Jul. 6, 2004, which is hereby incorporated by reference in its entirety.

1. Background to the Invention

This invention relates to a method of identifying the position of magnetic poles of a rotor of an electrical machine relative to a stator of that machine and more particularly although not exclusively to a method of operating a multi-phase permanent magnet motor driving system including a multi-phase converter which converts a DC input into a multi-phase AC output and supplies that output to the motor to drive it in which the position of magnetic poles of the rotor of the motor relative to the stator of the motor is identified at the beginning of a period of operation of the motor driving system.

The multi-phase converter of the permanent magnet motor driving system to which this invention relates typically comprises a pair of bistable switching means, conveniently transistors, for each phase, each pair of bistable switching means being connected in series between a positive and a negative of the DC input and each phase of the AC output being connected between the bistable switching means of the respective pairs.

It is desirable to estimate the position of magnetic poles of the rotor of the permanent magnet motor relative to the stator of that motor at the beginning of a period of operation of the motor driving system in order to be able to control the switching means of the converter so that the current that is appropriate for optimum performance of the motor is supplied to the motor.

2. Discussion of Prior Art

Methods have been proposed which avoid the need to use mechanical sensors for sensing the position of the rotor. One such a method which makes use of the effect of relative position of the rotor on the impedance of the stator of the motor and involves the application of a voltage impulse to the multi-phase stator windings as a step towards identification of the position of the magnets or rotor poles is disclosed in a paper entitled "Initial Rotor Angle Detection of a Non-Salient Pole Permanent Magnet Synchronous Machine" by Peter B. Schmidt et al, which was presented to the IEEE Industry Applications Society Annual Meeting, New Orleans, La. USA, Oct. 5–9, 1997. In carrying out this method, a saturation effect resulting in a high current occurs when an applied voltage impulse produces a current which produces flux in the same direction as the flux that is produced by the permanent magnets on the rotor. On the other hand, a lower current results when the direction of the flux produced by the rotor magnets is opposite to that of the flux produced by an applied voltage impulse. An analysis of the applied impulses and the occurrence of the maximum and minimum resulting currents enables the position of the magnets or rotor poles to be identified. At least one voltage impulse per phase has to be applied to the stator, one after another. For example, in a three phase system, the stator has to be supplied with a test impulse at least three times. A different topology is used in every case in which one phase is series connected to others which are in parallel. Hence, identifying the position of the magnets or rotor poles takes a long time, not only because at least one voltage impulse per phase must be applied one after another, but because time must be allowed after each applied voltage impulse for the current produced by that impulse to decay to zero before the next voltage impulse is applied. This long time is dead time which is not being used to produce useful torque. This problem is particularly disadvantageous where a permanent magnet motor has a large number of poles such as is the case with an axial flux permanent magnet machine, because the frequency of a machine having a large number of poles is proportionately higher than is the frequency of a machine which has fewer poles. The higher the frequency of a permanent magnet motor, the shorter the period of produced torque which is further reduced by the dead time required for identifying the position of the magnets or rotor poles. Moreover, the voltage impulses applied in the magnet or pole identification procedure lead to power losses which increase the temperatures of the stator windings without any positive effects. The lengthy interruptions needed for identification of the position of the magnets or rotor poles lead to a reduction in the time available to produce torque with the result that real torque is reduced. Hence, the higher the number of poles of the permanent magnet motor, the poorer is its performance when this method of identifying the position of the magnets or rotor poles is used.

SUMMARY OF THE INVENTION

An object of this invention is to provide a method of identifying the position of magnetic poles of a rotor of an electrical machine relative to a stator of that machine which does not involve so much dead time.

According to one aspect of this invention there is provided a method of identifying the position of magnetic poles of a rotor of a multi-phase electrical machine relative to a stator of that machine, including the steps of applying a voltage pulse to stator windings of each phase, sensing current flow in the stator windings of each phase due to the application of the voltage pulse to the respective stator windings and determining the position of the magnetic poles of the rotor relative to the stator using the sensed current flow in the stator windings of each phase, wherein the phases of the stator windings are star-connected at a neutral junction and the voltage pulse is applied to the stator windings of each phase in parallel.

Preferably, a method according to this aspect of this invention is part of a method of operating a multi-phase permanent magnet motor driving system including a multi-phase converter which converts a DC input into a multi-phase AC output and supplies that output to the motor to drive it, the converter comprising a pair of bistable switching means for each phase and a neutral which is connected to the neutral junction of the star-connection of the stator windings, each pair of bistable switching means being connected in series between a positive and a negative of the DC input and each phase of the output being connected between the bistable switching means of the respective pair, wherein the position of the magnetic poles of the rotor relative to the stator is identified by the method according to this aspect of this invention when the rotor is stationery or during initial low speed operation of the motor.

The step of determining the position of the magnetic poles of the rotor relative to the stator may include identifying the phase of the stator windings in which the magnitude of the sensed current is the greatest. In one embodiment of this invention the identified phase of the stator windings in which the magnitude of the sensed current is greatest is used as a coarse indication of the position of the magnetic poles of the rotor relative to the stator. In a preferred embodiment of this invention, the differences between the current flow sensed in the stator windings of each phase and the current flow sensed in the stator windings of each of the other phases are determined and those differences are used to identify a phase angle sector, the identified phase angle sector being an indication of the position of the magnetic poles of the rotor relative to the stator.

Once the position of magnetic poles of the rotor relative to the stator is identified by a method according to this aspect of this invention, control means of the driving system which control the switching of the bistable switching means to control operation of the converter to convert the DC input into the AC output which drives the motor are activated.

Use of the method in which this invention is embodied is particularly advantageous when the multi-phase permanent magnet motor is an axial flux machine such as is disclosed in our WO02/089292. Conveniently transistors are used as the bistable switching means of the multi-phase converter.

The invention has particular application when the electrical machine is employed as an engine driven generator in an electrical power generating system, the electrical machine also having a motor mode in which it is operable as a starting motor for the engine of the engine driven generator such as is disclosed in our co-pending application WO03/026125.

According to another aspect of this invention there is provided a system for identifying the position of magnetic poles of a rotor of a multi-phase electrical machine relative to a stator of that machine, including means operable to apply a voltage pulse to stator windings of each phase, means operable to sense current flow in the stator windings of each phase due to the application of the voltage pulse to the respective stator windings and means adapted to determine the position of the magnetic poles of the rotor relative to the stator using the sensed current flow in the stator windings of each phase, wherein the phases of the stator windings are star-connected at a neutral junction and said means operable to apply the voltage pulse are adapted to apply it to the stator windings of each phase in parallel.

In a preferred embodiment of this invention, means are provided for determining the differences between the current flow sensed in the stator windings of each phase and the current flow sensed in the stator windings of each of the other phases, and means adapted to use those differences are provided to identify a phase angle sector, the identified phase angle sector being an indication of the position of the magnetic poles of the rotor relative to the stator.

Preferably a system for identifying the position of magnetic poles of a rotor of a multi-phase electrical machine relative to a stator of that machine according to this further aspect of this invention is part of a multi-phase permanent magnet motor driving system including a multi-phase converter which converts a DC input into a multi-phase AC output and supplies that output to the motor to drive it, the converter comprising a pair of bistable switching means for each phase, each pair of bistable switching means being connected in series between a positive and negative of the DC input and each phase of the output being connected between the bistable switching means of the respective pair.

Conveniently, the bistable switching means are transistors and the multi-phase permanent magnet motor is an axial flux machine which may have a generator phase and a motor phase and which may be adapted for use as a starter motor to start an engine of an engine driven power generation system, the engine being adapted to drive the multi-phase electrical machine as a generator in the power generation mode.

A three phase axial flux 2-pole permanent magnet motor driving system and a method of identifying the position of the rotor of the 2-pole permanent magnet motor which embodies the present invention will be described now by way of example with referenced to the accompanying drawings.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
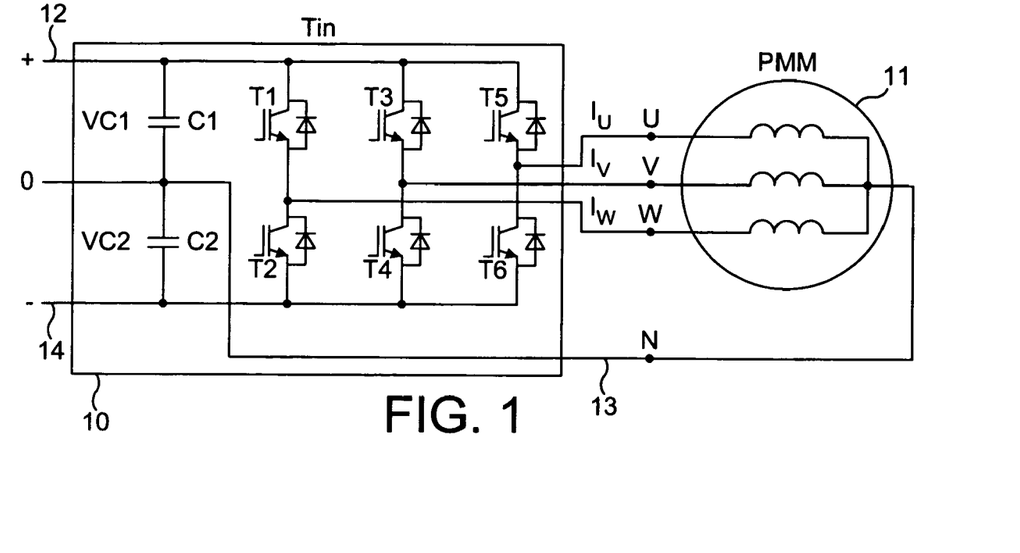
FIG. 1 is a circuit diagram of the axial flux permanent magnet motor driving system.

FIG. 1 shows a three phase, four wire, transistor inverter 10 connected to a permanent magnet motor 11. The inverter 10 has a positive DC voltage input line 12, a neutral line 13 and a negative DC voltage input line 14. A capacitor C1 is connected across the DC voltage input line 12 and the neutral line 13. A capacitor C2 is connected across the negative DC input line 14 and the neutral line 13. The neutral line 13 is connected to a neutral terminal of the permanent magnet motor 11. Three pairs of transistors T1 and T2, T3 and T4 and T5 and T6 are connected in parallel one with another and with the pair of capacitors C1 and C2 across the positive and negative DC voltage input lines 12 and 14. The emitters of the transistors T1, T3 and T5 are connected to the collectors of the transistors T2, T4 and T6. The series connection between the transistors of each pair T1 and T2, T3 and T4 and T5 and T6 is connected to the respective power output terminal U, V, W of the inverter 10. Each of the three phase windings of the permanent magnet motor 11 is connected to a respective one of the power output terminals U, V, W of the inverter 10. Suitable control means (not shown) are connected to the base of each of the transistors T1–T6 and are provided for controlling operation of the transistors T1–T6 as bistable switching means by appropriate pulse width modulated control signals.

The inverter 10 is a multi-phase converter which converts a DC input supplied on the positive and negative voltage input lines 12 and 14 into a three phase AC output by operation as bistable switching means of a respective one of the three pairs of transistors T1 and T2, T3 and T4, T5 and T6, the AC output for each phase U, V, W being supplied to a respective one of the stator windings of the inverter 10 in parallel to drive the permanent magnet motor 11.

In order to maximize the output torque of the permanent magnet motor 11, it is first desirable to identify the position of magnetic poles of the rotor of the permanent magnet motor 11 relative to its stator and to determine which of the transistors T1–T6 should be the first to be switched by the control means to start driving the permanent magnet motor 11. It is first necessary to ensure that there is no current flowing in any of the three phases of the stator windings and a time t1 is allowed to ensure that any current has decayed to zero.

Figure 2:
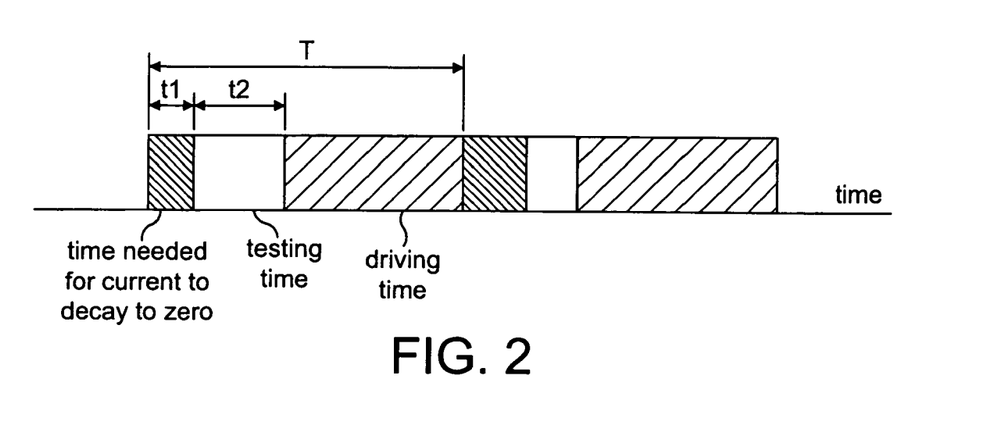
FIG. 2 is a diagram illustrating a period of operation of the permanent magnet motor driving system.

FIG. 2 shows that of a total period T of operation of motor 11, the period t1 is that required to ensure that any current flow has decayed to zero, period t2 is the time devoted to identifying the relative position of the magnetic poles of the rotor and the stator of the motor 11 and to identify which of the first transistors T1–T6 are to be switched on first and the remainder (T-t1-t2) is the useful torque producing driving time.

Figure 3:
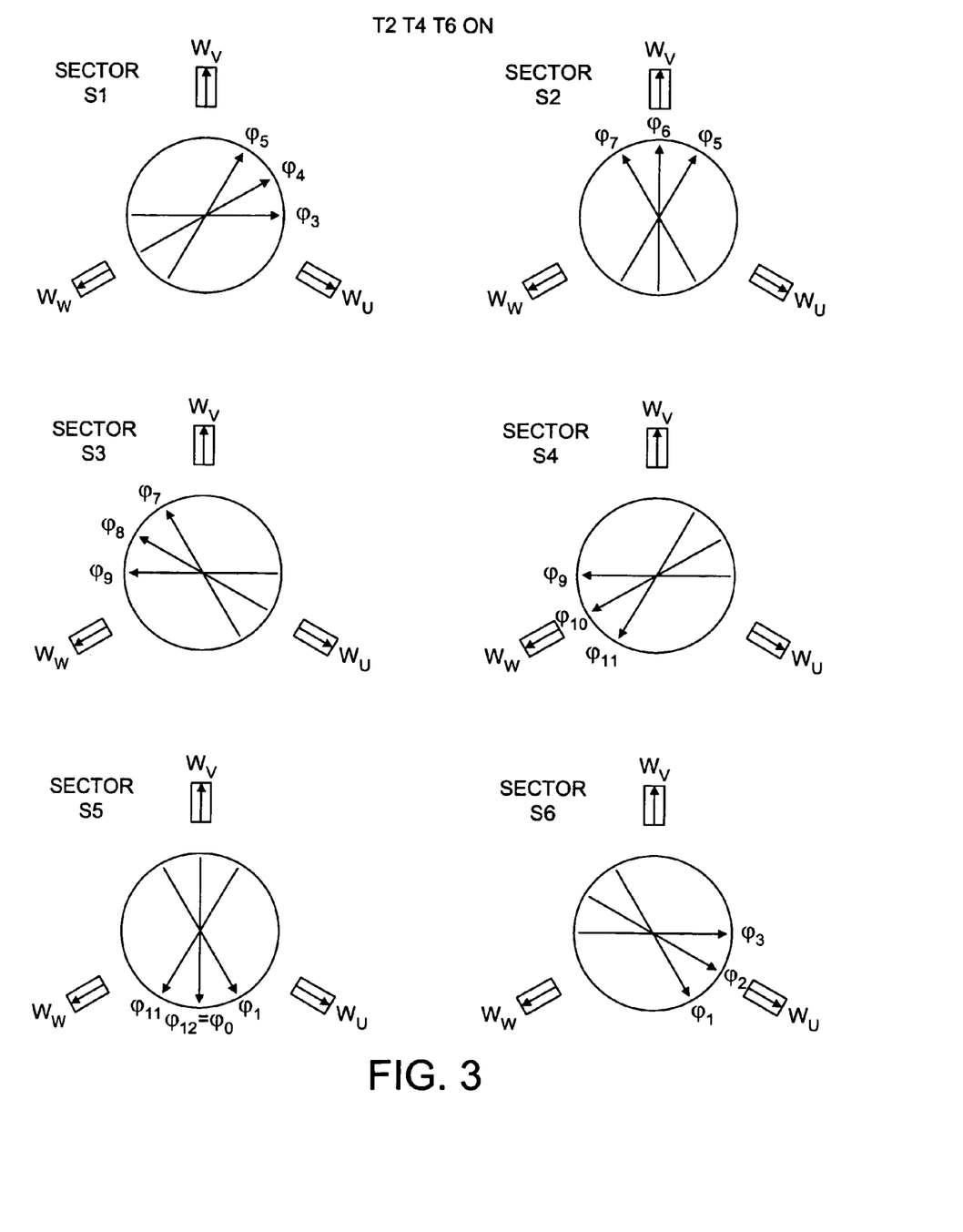
FIG. 3 comprises six phase diagrams of flux produced by current flow in the stator windings and of flux produced by the permanent magnets of the 2-pole rotor of the permanent magnet motor illustrated in FIG. 1, there being one diagram for each 60 electrical degree sector of a cycle of rotor flux, and the rotor flux being shown at 30 electrical degree intervals in each of the six 60 electrical degree sectors of the flux cycle.

The phase diagrams of FIG. 3 illustrate by the rectangles Wu, Wv, Ww, the direction of maximum flux produced by current flow in the respective stator windings and by the arrows $\Phi_1$–$\Phi_{12}$, the direction, phase angle and magnitude of the maximum flux produced by the permanent magnets of the permanent magnet motor 11. The arrow in each rectangle Wu, Wv, Ww indicates the direction of the maximum flux induced by current flow in the respective stator winding when that stator winding is connected to the negative DC input line 14 by switching on the respective transistor T2, T4, T6. The direction of the maximum flux induced by current flow in each stator winding will be the opposite to that shown in FIG. 3 when that stator winding is connected to the positive DC input line 12 by switching on the respective transistors T1, T3, T5. Each of the six phase diagrams illustrates the magnitude and phase angle of the maximum flux produced by the permanent magnets at 30° intervals in a respective one of six 60° phase angle sectors which together make up one cycle. It will be noted that in each phase diagram, the central arrow $\Phi_4$, $\Phi_6$, $\Phi_8$, $\Phi_{10}$, $\Phi_{12}$, $\Phi_2$ is aligned with the direction of maximum flux produced by current flow in one of the stator windings Wu, Wv, Ww. Also in three of the sectors, that is to say in sectors S2, S4 and S6 in the example shown in FIG. 3, the direction of maximum flux produced by the permanent magnets of the motor 11 is the same as the direction of maximum flux induced by current flow in the respective stator winding whereas, in the other three sectors S1, S3, S5, the direction of maximum flux produced by the permanent magnets is opposite to the direction of maximum flux induced by current flow in the respective stator windings.

A method of identifying the position of magnetic poles of the rotor of the permanent magnet motor 11 relative to its stator which only requires a single application of a voltage pulse to the three phases of the stator windings will now be described with reference to FIGS. 3 to 8.

Figure 4:
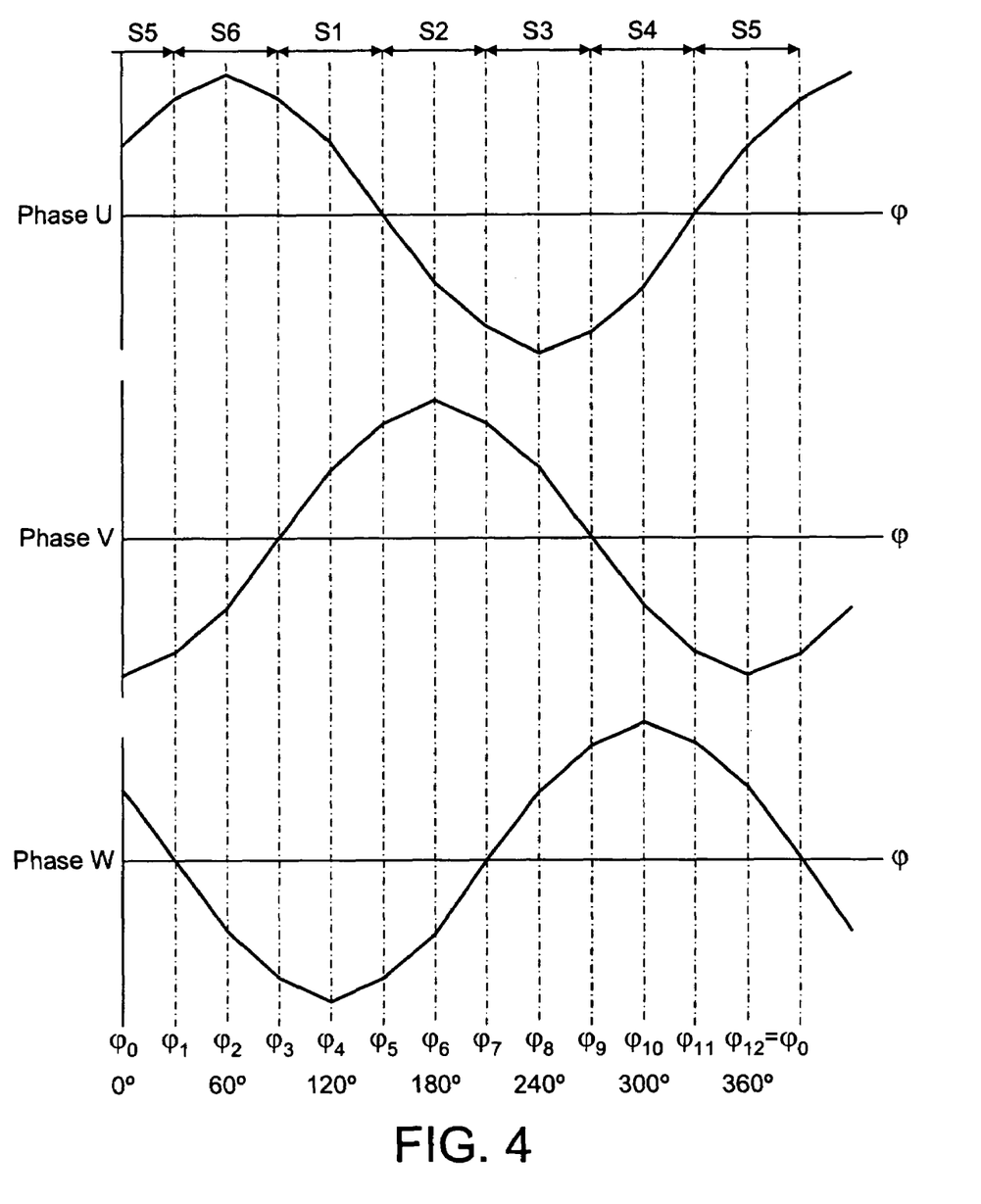
FIG. 4 is a graph showing the distribution of flux produced by the permanent magnets of the 2 pole permanent magnet motor plotted over the six sectors of the flux cycle as illustrated in FIG. 3.
Figure 5:
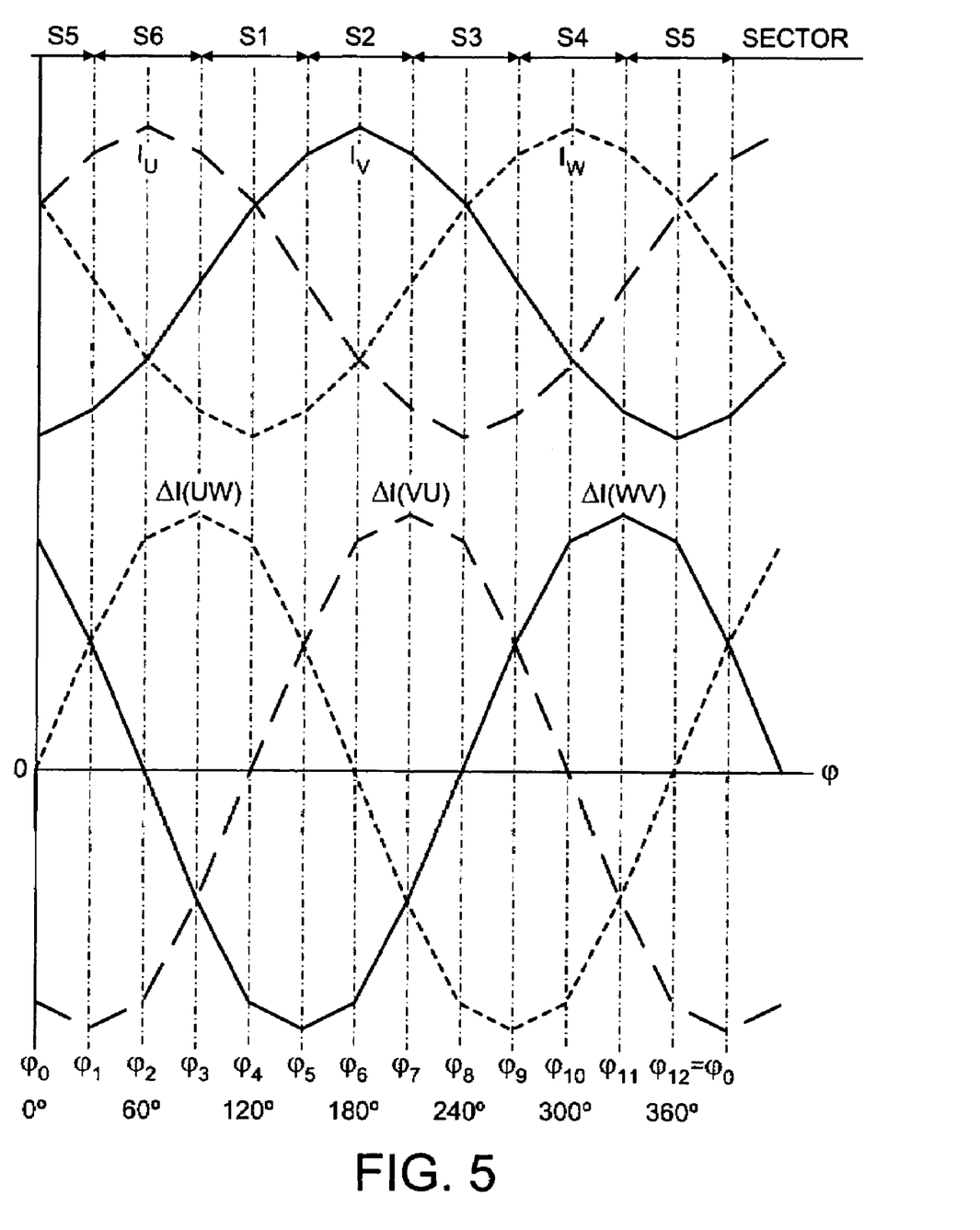
FIG. 5 is a graph showing the anticipated pattern of current flow in each phase of the stator windings of the permanent magnet machine above curves of the differences between the anticipated current flow in pairs of the three phases.

The upper part of FIG. 5 is a plot of the anticipated maximum current flow in each of the three phases U, V, W of the permanent magnet motor 11 as a function of the rotational angle of the rotor in electrical degrees, when the negative input voltage on the line 14 is applied to the windings in parallel by switching on the three transistors T2, T4 and T6. FIGS. 3 and 4 show that, in sector S6, the maximum flux produced by the permanent magnets is close to alignment with the maximum flux Wu produced by current flow in the U phase of the stator windings when the rotor is in the angular positions $\Phi_1$, $\Phi_2$ and $\Phi_3$ and is aligned with and in the same direction as the maximum flux Wu when the rotor is in the angular position $\Phi_2$. Also, in sector 3, the maximum flux produced by the permanent magnets is close to alignment with the maximum flux Wu when the rotor is in the angular positions $\Phi_7$, $\Phi_8$ and $\Phi_9$ and is aligned with, but is in the opposite direction to the maximum flux $W_u$ when the rotor is in the angular position $\Phi_8$. Hence the current Iu in the U phase should be at its maximum when the rotor is in the position shown in sector 6 and more particularly when it is in the angular position $\Phi_2$ and should be at its minimum when the rotor is positioned in sector 3 and more particularly when it is in the angular position $\Phi_8$. This is shown in FIG. 5 which also shows that the peak of the sinusoidal pattern for the anticipated maximum current Iv is in the sector S2 and the minimum of that sinusoidal pattern is in the sector S5 and the peak of the sinusoidal pattern of the anticipated maximum current Iw occurs in the sector S4 and the minimum of that sinusoidal pattern occurs in the sector S1.

The lower part of FIG. 5 shows three further sinusoidal patterns $\Delta I$ (UW), $\Delta I$ (VU) and $\Delta I$ (WV). The pattern $\Delta I$ (UW) is the difference between the sinusoidal patterns Iu and Iw in the upper part of FIG. 5. The sinusoidal pattern $\Delta I$ (VU) is the difference between the sinusoidal patterns Iv and Iu. $\Delta I$ (WV) is the difference between the sinusoidal patterns Iw and Iv. The sinusoidal curve $\Delta 1$ (UW) peaks at phase angle $\Phi_3$ which is the boundary between sectors S6 and S1. Its trough or minimum is at phase angle $\Phi_9$ which is the boundary between sectors S3 and S4. The sinusoidal pattern $\Delta I$ (VU) peaks at phase angle $\Phi_7$ which is the boundary between sectors S2 and S3 and its trough or minimum is at phase angle $\Phi_1$ which is the boundary between sectors S5 and S6. The sinusoidal pattern $\Delta I$ (WV) has its trough or minimum at phase angle $\Phi_5$ which is the boundary between sectors S1 and S2 and its peak at phase angle $\Phi_{11}$ which is the boundary between sectors S4 and S5.

The information shown in FIG. 5 conveniently is stored in an electronic signal processor, say by means of a look-up table.

In carrying out this method of determining the position of the magnetic poles of the rotor of the permanent magnet motor 11 relative to its stator using the information shown in FIGS. 3, 4 and 5, DC voltage pulses are applied to each stator winding U, V, W in parallel by switching on respective ones of the transistors T2, T4 and T6. The magnitude of the current flow induced in the stator windings U, V, W by the application of those DC voltage pulses for a certain time is measured. The one of the three currents Iu, Iv, Iw that is the highest is identified. That is the current in the stator winding which is the most saturated. The most saturated stator winding has the lowest inductance and thus the lowest time constant and the quickest rising current. In theory, identification of the current Iu, Iv, Iw that is the highest should enable the sector S1–S6 in which the magnets are positioned to be identified, but the difference between the magnitude of the measured currents Iu, Iv and Iw is small and a more precise identification of the respective sector, including its angular limits, is required. To this end, the difference between the measured values of Iu and Iw is calculated to give a measured reading of $\Delta I$ (UW), the difference between the measured values of Iv and Iu is calculated to give a value for $\Delta I$ (VU), and the difference between the measured values Iw and Iv is calculated to give a value for $\Delta I$ (WV).

Figure 6:
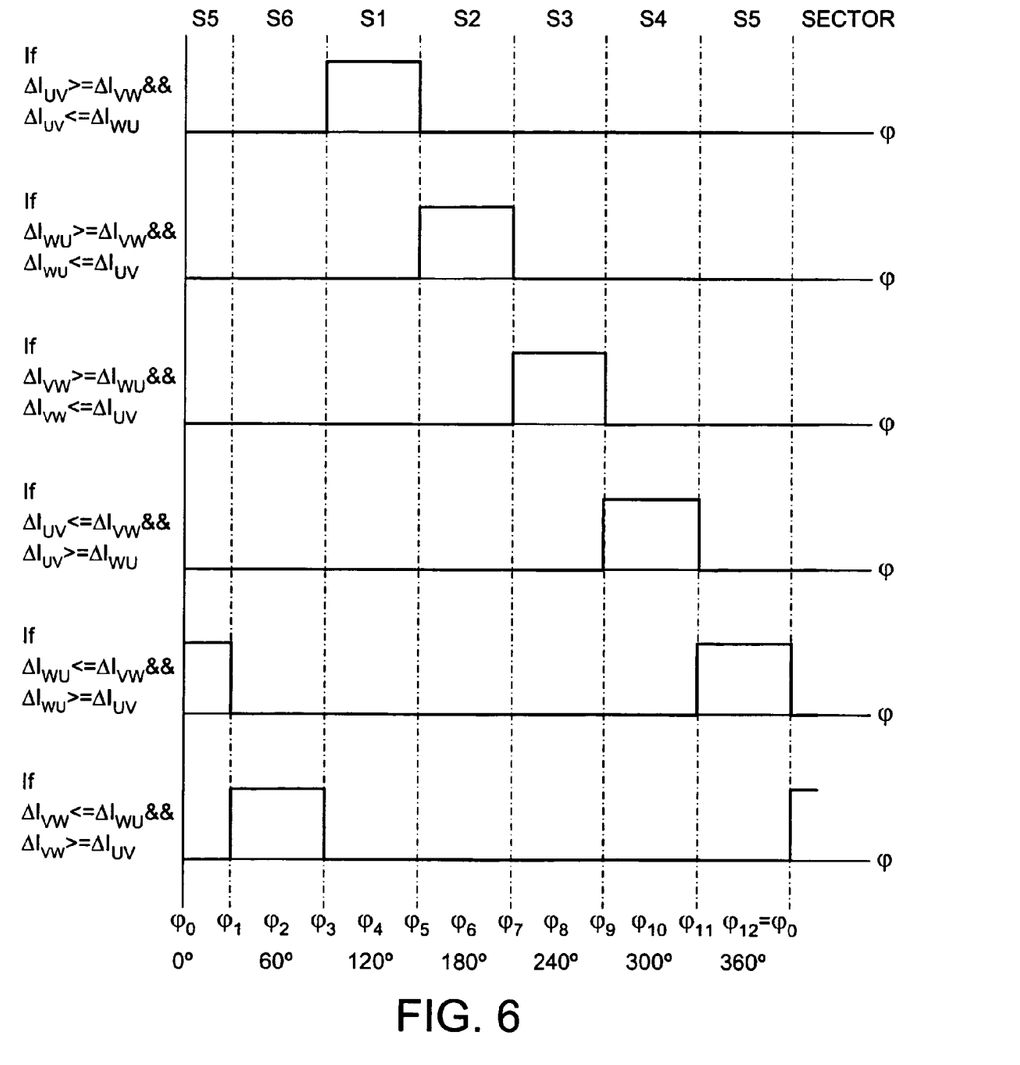
FIG. 6 is a diagrammatic illustration of results of a logic comparison of the differences between the measured current flow in pairs of the three phases of the stator windings of the permanent magnet motor illustrated in FIG. 1.

Having obtained the values $\Delta I$(UW), $\Delta I$(VU) and $\Delta I$(WV), a precise determination of the sector S1–S6 in which the magnetic poles on the rotor are positioned is deduced by a logic comparison of those values $\Delta I$(UW), $\Delta I$(VU) and $\Delta I$(WV). The logic comparison is illustrated in FIG. 6 and is as follows:

If $\Delta I$(VU) is greater than $\Delta I$(WV) and $\Delta I$(VU) is less than $\Delta I$(UW) the rotor poles are positioned in Sector S1

If $\Delta I$(UW) is greater than $\Delta I$(WV) and $\Delta I$(UW) is less than $\Delta I$(VU) the rotor poles are positioned in Sector S2

If $\Delta I$(WV) is greater than $\Delta I$(UW) and $\Delta I$(WV) is less than $\Delta I$(VU) the rotor poles are positioned in Sector S3

If $\Delta I$(VU) is greater than $\Delta I$(UW) and $\Delta I$(VU) is less than $\Delta I$(WV) the rotor poles are positioned in Sector S4

If $\Delta I$(UW) is greater than $\Delta I$(VU) and $\Delta I$(UW) is less than $\Delta I$(WV) the rotor poles are positioned in Sector S5

If $\Delta I$(WV) is greater than $\Delta I$(VU) and $\Delta I$(WV) is less than $\Delta I$(UW) the rotor poles are positioned in Sector S6

Figure 7:
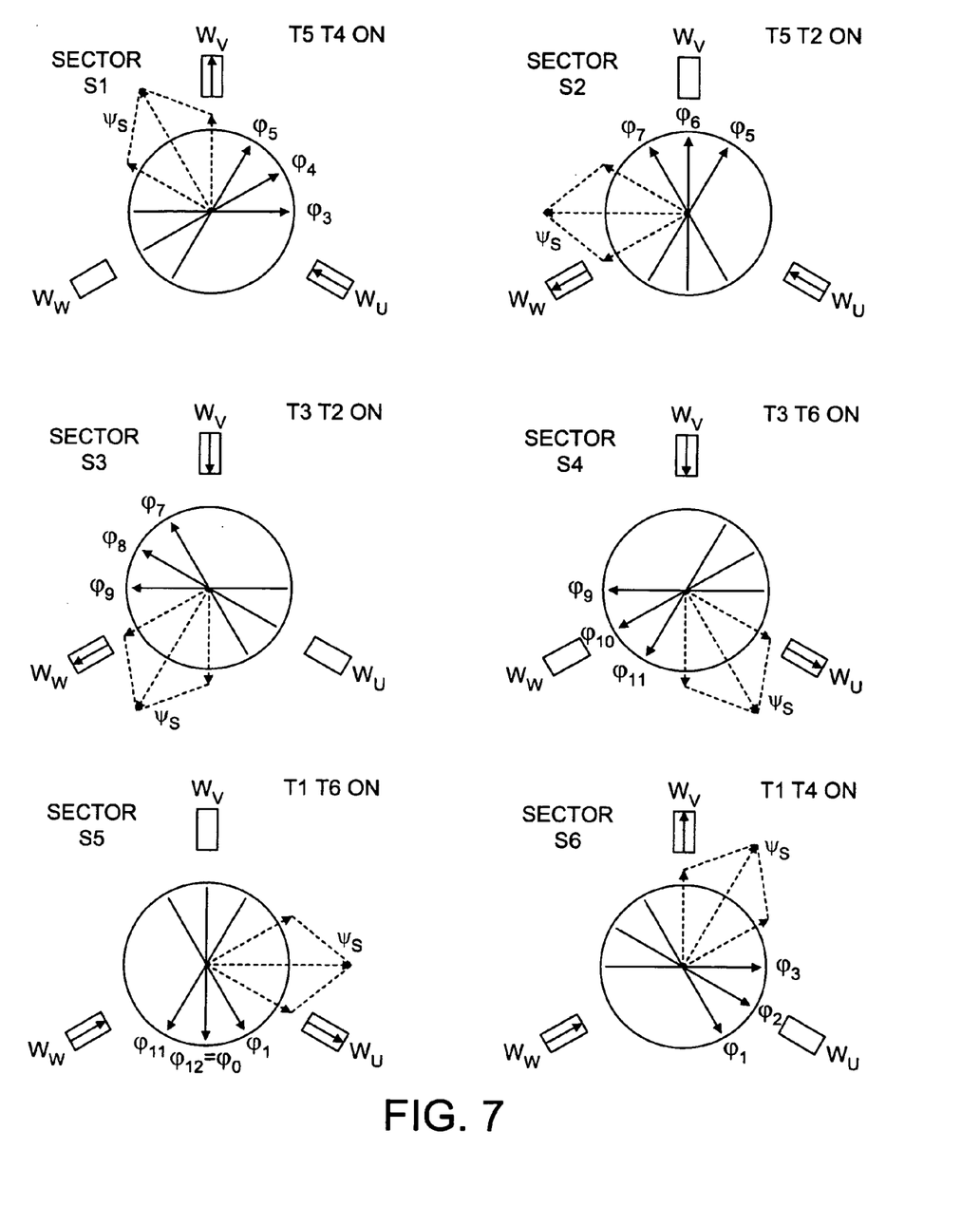
FIG. 7 is similar to FIG. 2 and illustrates production of a rotor driving torque.

Having identified the sector S1–S6 in which the rotor poles are positioned and knowing the magnitude and direction of the magnetic flux produced by those poles in that sector as illustrated in FIG. 3, the man skilled in the art will know the pair of transistors T1–T6 that need to be switched on to produce a resultant magnetic flux $\Phi_s$ that will interact with the magnetic flux induced in the identified sector S1–S6 by the rotor poles to produce the optimum driving torque on the rotor for starting the motor 11. This is illustrated in FIG. 7. For example, if sector 6 is identified as being the sector in which the magnetic poles of the rotor are positioned, it will be necessary to switch on the transistors T1 and T4 to feed the greatest current to the stator windings V and W. FIG. 7 also shows that the transistors to be switched on if sector 1 is identified are T4 and T5 to feed current to the V and U phases, for sector S2 it will be the transistors T2 and T5 for the U and W phases, for sector S3, it will be transistors T2 and T3 for the V and W phases, for sector S4 it will be the transistors T3 and T6 for the U and V phases and for sector S5 it will be the transistors T1 and T6 for the U and W phases. The motor driving system will be provided with a suitable signal processing arrangement so that the control means will respond to a signal indicative of the identified phase angle sector S1–S6 in which the magnetic poles of the rotor are positioned by switching on the respective pair of transistors T1–T6 so that the current that will be fed to the stator windings will be the greatest and the maximum driving torque will therefore be applied to start driving the motor 11.

Figure 8:
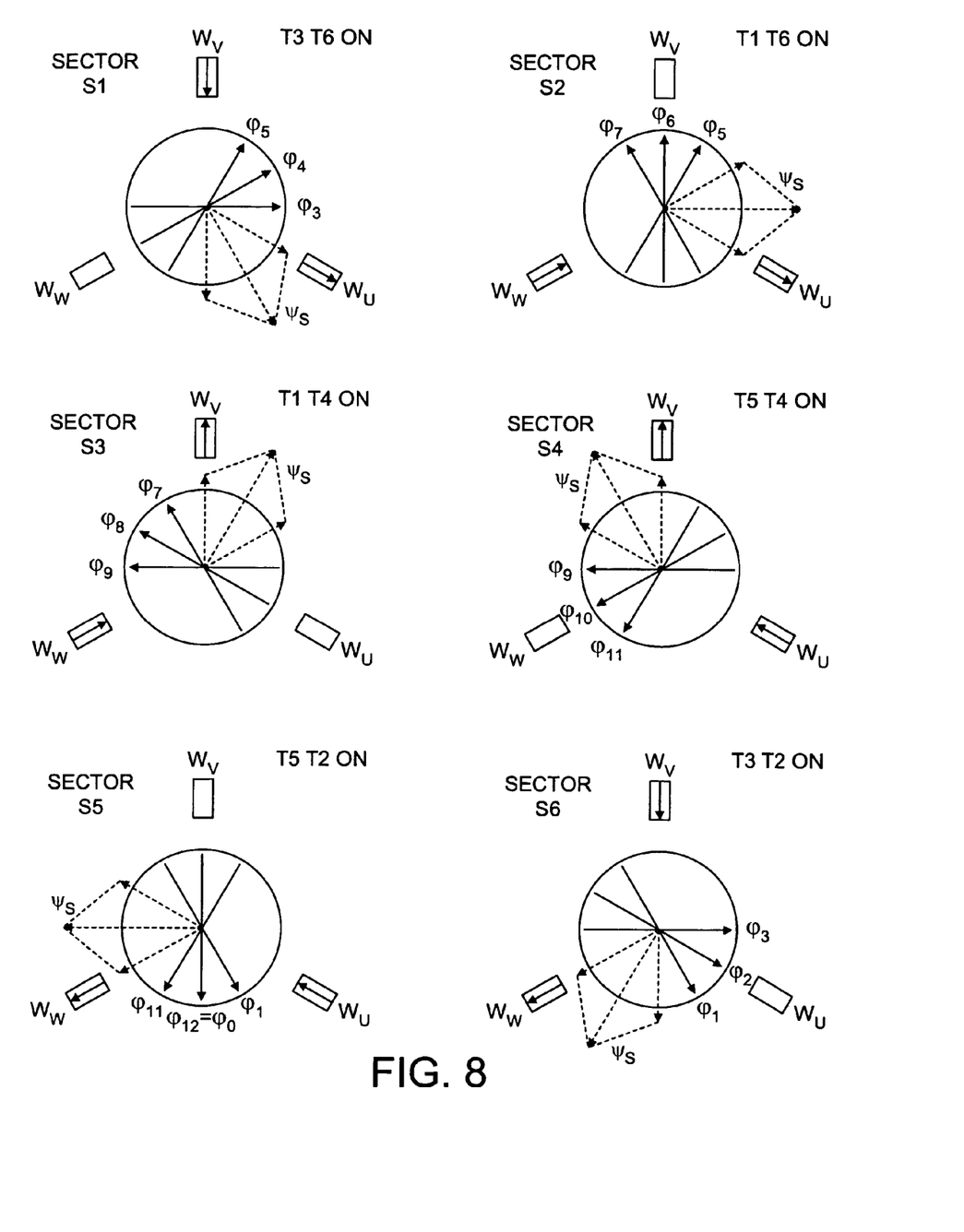
FIG. 8 is similar to FIG. 7 and illustrates production of a rotor driving torque in the opposite direction to the direction shown in FIG. 7.

FIG. 8 illustrates the pairs of transistors that will need to be switched on if a torque is to be applied to the rotor in the opposite angular sense to that described above with reference to FIG. 7. Thus, if the identified sector is sector S1, the transistors to be switched on will be T3 and T6 for the stator winding phases U and V. For sector S2, the transistors to be switched on will be T1 and T6 for the phases U and W. For sector S3, the transistors to be switched on will be T1 and T4 for the phases V and W. For sector S4, the transistors to be switched on will be T4 and T5 for the U and V phases.

For sector S5, the transistors to be switched on will be T2 and T5 for the U and W phases. For sector S6, the transistors to be switched on will be T2 and T3 for the V and W phases.

In carrying out an alternative method of identifying the position of the rotor of the permanent magnet motor 11 relative to its stator, after the period t1 has elapsed, the control means are activated to switch the three transistors T1, T3 and T5 that are connected to the positive DC voltage input line 12 to connect that positive DC voltage input line 12 to the respective power output terminal U, V, W to impart a positive voltage pulse to each of the respective stator windings of the permanent magnet motor 11. Once the control means has disconnected the positive DC voltage input line 12 from the power output terminals U, V, W, and sufficient time has been allowed to ensure that any current has decayed to zero, the control means activates the other three transistors T2, T4 and T6 to transmit a negative voltage pulse from the negative DC voltage input line 14 to each of the power output terminals U, V, W from where those pulses are applied to each of the three stator windings of the permanent magnet motor 11.

Current flow through the three stator windings of the permanent magnet motor 11 in parallel due to the application of the positive and negative voltage pulses is recorded, say by a suitably connected oscilloscope. By appropriate signal processing, the greatest of the positive current pulses and the greatest of the negative current pulses in the stator windings are identified and the phase in which each of those greatest positive and negative current pulses occurred is identified.

Having identified the phases of the stator windings in which the greatest of the positive and negative current pulses were recorded, the phases are compared with a graph showing the anticipated maximum current flow in each phase U, V, W of the stator windings plotted against the six sectors of one flux cycle and the one sector in which they both occur is identified and used as an indication of the position of the magnetic poles of the rotor with respect to the stator. For example, if the greatest positive current pulse occurred in the U phase and the greatest negative current pulse occurred in the W phase, the magnetic poles of rotor would be taken to be positioned in Sector 2 (S2). This position identification could be performed manually or by signal processing. Further, the transistor T1, T3 or T5 that was switched on to produce the recorded maximum current pulse (namely the transistor T1 in the example that identified the position of the magnetic poles of the rotor as being in Sector 2) is selected as the transistor which is the first to be switched on when commencing driving the motor 11 to produce torque.

Figure 9:
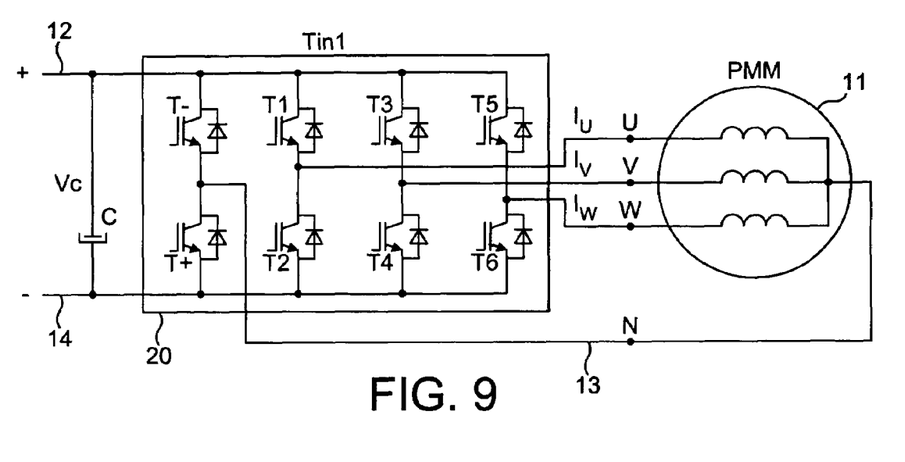
FIG. 9 is a circuit diagram of a motor driving system according to the present invention.

FIG. 9 shows a circuit diagram of another embodiment of the axial flux permanent magnet motor driving system with poles position identification. In FIG. 9 a three phase, four wire, transistor inverter 20 is connected to a permanent magnet motor 11. The inverter 20 has a positive DC voltage input line 12, a neutral line 13 and a negative DC voltage input line 14. A capacitor C is connected across the DC voltage input line 12 and the negative DC input line 14. Three pairs of transistors T1 and T2, T3 and T4 and T5 and T6 are connected in parallel one with another across the positive and negative DC voltage input lines 12 and 14. The emitters of the transistors T1, T3 and T5 are connected to the collectors of the transistors T2, T4 and T6. The series connection between the transistors of each pair T1 and T2, T3 and T4 and T5 and T6 is connected to the respective power output terminal U, V, W of the inverter 20. Each of the three phase windings of the permanent magnet motor 11 is connected to a respective one of the power output terminals U, V, W of the inverter 20. Suitable control means (not shown) are connected to the base of each of the transistors T1-T6 and are provided for controlling operation of the transistors T1–T6, as bistable switching means by appropriate pulse width modulated control signals.

As can be seen from FIG. 9, a pair of transistors T− and T+ is connected across positive and negative DC voltage. The neutral line 13 is connected to a neutral terminal of the permanent magnet motor 11 and to connection between transistors T− and T+. Suitable control means (not shown) are connected to the base of each of the transistors T− and T+ for controlling their operation. The transistors T− and T+ are used during the poles position identification process.

During the poles position identification process the PMM motor windings are operated in parallel. This is achieved by appropriate switching of the transistors T1–T6, T− and T+. In this embodiment a negative pulse is first applied in parallel to the motor windings, followed by a positive pulse. This is achieved in the following way.

First the transistors T−, T2, T4 and T6 are switched to the ON state, while the transistors T+, T1, T3 and T5 are in the OFF state. In this way the motor neutral point 13 is connected to positive line 12 and the motor terminals U, V, W are connected to negative line 14. This causes a negative pulse to be applied in parallel to the motor windings. The current flow through the windings is recorded.

The transistors T−, T2, T4 and T6 are then switched to the OFF state. After the current has decayed to zero, the transistors T+, T1, T3 and T5 are switched to the ON state. In this way the neutral point is connected to negative line 14 and the motor terminals U, V, W are connected to positive line 12. This causes a positive pulse to be applied to the motor windings. The current flow through the windings is again recorded. The transistors T+, T1, T3 and T5 are then switched to the OFF state Once the current from both the positive and negative pulses has been recorded, the positions of the poles can be identified in the same way as described above with reference to FIGS. 1 to 8. The motor can then be drive by appropriate operation of the transistors T1–T6. During the motor driving operation the transistors T− and T+ are in the OFF state.

In this embodiment the voltage pulse which is applied to the motor windings is twice the magnitude of the voltage pulse applied to the motor windings in FIG. 1, which may increase the accuracy of the technique.

It will be appreciated that in any embodiment either a single positive pulse or a single negative pulse could be applied. If two pulses are applied, either a positive or a negative pulse could be applied first. If desired, a plurality of pulses could be applied in order to increase the reliability of the results.

In any of the above embodiments the motor may be an electrical machine which has a generator phase and a motor phase. In the generator phase the electrical machine may be driven by an engine to generate power. In the motor phase the electrical machine may be used as a starter motor to start the engine. This may avoid the need to provide a separate starter motor.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of identifying the position of magnetic poles of a rotor of a multi-phase electrical machine relative to a stator of that machine, including the steps of applying a voltage pulse to stator windings of each phase, sensing current flow in the stator windings of each phase due to the application of the voltage pulse to the respective stator windings and determining the position of the magnetic poles of the rotor relative to the stator using the sensed current flow in the stator windings of each phase, wherein the phases of the stator winding are star-connected at a neutral junction and the voltage pulse is applied to the stator windings of each phase in parallel, wherein the differences between the current flow sensed in the stator windings of each phase and the current flow sensed in the stator windings of each of the other phases are determined and those differences are used to identify a phase angle sector, the identified phase angle sector being an indication of the position of the magnetic poles of the rotor relative to the stator.

2. A method according to claim 1, the method being part of a method of operating a multi-phase permanent magnet motor driving system including a multi-phase converter which converts a DC input into a multi-phase AC output and supplies that output to the motor to drive it, wherein the position of the magnetic poles of the rotor relative to the stator is identified by the method according to claim 1 when the rotor is stationery or during initial low speed operation of the motor.

3. A method according to claim 2 wherein the converter is used to apply the voltage pulse to the stator winding of each phase in parallel.

4. A method according to claim 2 wherein the converter comprises a pair of bistable switching means for each phase and a neutral line which is connected to the neutral junction of the star-connection of the stator winding, each pair of bistable switching means being connected in series between a positive and a negative of the DC input and each phase of the output being connected between the bistable switching means of the respective pair, the method comprising turning one bistable switching means of each pair ON while keeping the other bistable switching means of each pair OFF, thereby applying the voltage pulse to the stator windings of each phase in parallel.

5. A method according to claim 4, the converter comprising a further pair of bistable switching means connected in series between the positive and negative of the DC input, the neutral line being connected between the bistable switching means of the further pair, the method further comprising turning one bistable switching means of the further pair ON, thereby connecting the neutral line to the DC.

6. A method according to claim 1 wherein the step of determining the position of the magnetic poles of the rotor relative to the stator includes identifying the phase of the stator winding in which the magnitude of the sensed current is the greatest.

7. A method according to claim 6, wherein the identified phase of the stator windings in which the magnitude of the sensed current is the greatest is used as a coarse indication of the position of the magnetic poles of the rotor relative to the stator.

8. A method according to claim 1 wherein the multi-phase electrical machine has a generator phase and motor phase, and wherein said electrical machine is used as a starter motor to start an engine in the motor phase, and the engine is used to drive said electrical machine in the generator phase, thereby to generate an electrical output.

9. A system for identifying the position of magnetic poles of a rotor of a multi-phase electrical machine relative to a stator of that machine, including means operable to apply a voltage pulse to stator winding of each phase, means operable to sense current flow in the stator winding of each phase due to the application of the voltage pulse to the respective stator windings and means adapted to determine the position of the magnetic poles of the rotor relative to the stator using the sensed current flow in the stator windings of each phase, wherein the phases of the stator windings are star-connected at a neutral junction and said means operable to apply the voltage pulse are adapted to apply it to the stator windings of each phase in parallel, wherein means are provided for determining the differences between the current flow sensed in the stator windings of each phase and the current flow sensed in the stator windings of each of the other phases, and means adapted to use those differences are provided to identify a phase angle sector, the identified phase angel sector being an indication of the position of the magnetic poles of the rotor relative to the stator.

10. A system according to claim 9 which is part of a multi-phase permanent magnet driving system including a multi-phase converter which converts a DC input into a multi-phase AC output and supplies that output to the motor to drive it, the converter being arranged to apply the voltage pulse to the stator windings of each phase in parallel.

11. A system according to claim 10, the converter comprising a pair of bistable switching means for each phase, each pair of bistable switching means being connected in a series between a positive and negative of the DC input and each phase of the output being connected between the bistable switching means of the respective pair, the system further comprising control means arranged to turn one bistable switching means of each pair ON while keeping the other bistable switching means of each pair OFF, so as to apply the voltage pulse to the suitor windings of each phase in parallel.

12. A system according to claim 11, the converter comprising a further pair of bistable switching means connected in series between the positive and negative of the DC input, the neutral line being connected between the bistable switching means of the further pair, the control means being arranged to turn one bistable switching mans of the further pair ON, thereby connecting the neutral line to the DC.

13. A system according to claim 9 wherein the multi-phase electrical machine has a generator phase and a motor phase and which is adapted for use as a starter motor to start an engine of an engine driven power generation system, the engine being adapted to drive the multi-phase electrical machine as a generator in the power generation phase.

* * * * *